(12) United States Patent  
Appleton et al.

(10) Patent No.: US 8,488,882 B1
(45) Date of Patent: Jul. 16, 2013

(54) NON-LINEAR TRANSFORMATION OF IMAGES IN WEB BROWSERS

(75) Inventors: Benjamin C. Appleton, Summer Hill (AU); James B. McGill, Pyrmont (AU)

(73) Assignee: Google Inc., Mountain View, CA (US)

( * ) Notice: Subject to any disclaimer, the term of this patent is extended or adjusted under 35 U.S.C. 154(b) by 124 days.

(21) Appl. No.: 13/206,950

(22) Filed: Aug. 10, 2011

(51) Int. Cl.
*G06K 9/00* (2006.01)
*G06K 9/34* (2006.01)

(52) U.S. Cl.
USPC ........................................... 382/173

(58) Field of Classification Search
USPC ................ 382/164, 173, 232, 276–277
See application file for complete search history.

(56) References Cited

U.S. PATENT DOCUMENTS

| | | | | |
|---|---|---|---|---|
| 5,809,172 A | * | 9/1998 | Melen | 382/232 |
| 6,208,772 B1 | * | 3/2001 | Wilt et al. | 382/308 |

* cited by examiner

*Primary Examiner* — Amir Alavi
(74) *Attorney, Agent, or Firm* — Fish & Richardson P.C.

(57) ABSTRACT

Methods, systems, and apparatus, including computer programs encoded on a computer storage medium, for receiving an image file including image data corresponding to a digital image, the digital image being provided in a first space, and projecting the digital image using a non-linear invertible map projection to generate a projected image, the projected image being provided in a second space, projecting the digital image is achieved by: dividing the digital image into segments, scaling each segment to provide modified segments, and generating the projected image using the modified segments.

17 Claims, 5 Drawing Sheets

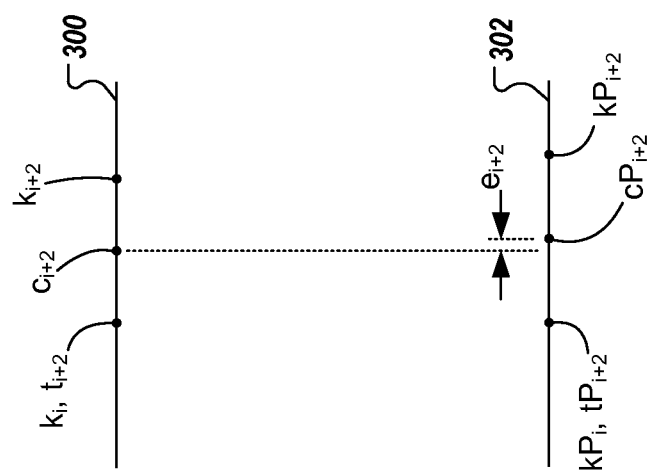

NON-LINEAR TRANSFORMATION OF IMAGES IN WEB BROWSERS

BACKGROUND

This specification generally relates to displaying images in web browsers.

Projecting an image of a curved surface onto a flat surface can be problematic. For example, a map projection can be used to represent a curved surface on a flat surface of a map (e.g., representing the curved surface of the Earth on the flat surface of a map). Map projections enable the representation of a curved surface on a flat surface, which can be presented as a digital image on a computer screen. There are numerous map projections that can be implemented (e.g., Mercator projection).

Although a three-dimensional (3D) globe can provide an accurate representation of a curved surface, globes are not always practical. For example, two-dimensional (2D) images of 3D surfaces are often displayed to users within web browser applications. To achieve this, non-linear warping of images can be used. Some web browsers, however, have limited functionality and do not support for non-linear warping of images.

SUMMARY

In general, innovative aspects of the subject matter described in this disclosure may be embodied in methods that include the actions of receiving an image file including image data corresponding to a digital image, the digital image being provided in a first space, and projecting the digital image using a non-linear invertible map projection to generate a projected image, the projected image being provided in a second space, projecting the digital image is achieved by: dividing the digital image into segments, scaling each segment to provide modified segments, and generating the projected image using the modified segments. Other implementations of this aspect include corresponding systems, apparatus, and computer programs, configured to perform the actions of the methods, encoded on computer storage devices.

These and other implementations may each optionally include one or more of the following features. For instance, dividing the digital image into segments includes, for each of an x-direction and a y-direction of the digital image: projecting an upper bound of the digital image as a maximum, projecting a lower bound of the digital image as a minimum, and iterating from the minimum to the maximum to provide one or more slices in the image, the one or more slices defining the segments; dividing the digital image into segments includes, for each of an x-direction and a y-direction of the digital image: providing a potential slice that extends from a previous actual slice and a current projected point, determining a center point of the potential slice in the first space, determining a center point of the potential slice in the second space, and calculating a difference between the center point of the potential slice in the first space and the center point of the potential slice in the second space; dividing the digital image into segments further includes, for each of an x-direction and a y-direction of the digital image: determining that the difference is greater than or equal to a threshold difference, and, in response to determining that the difference is greater than or equal to a threshold difference, setting a previous potential slice as an actual slice; dividing the digital image into segments further includes, for each of an x-direction and a y-direction of the digital image: determining that the difference is less than a threshold difference, and, in response to determining that the difference is less than a threshold difference: selecting a second potential slice, determining a center point of the second potential slice in the first space, determining a center point of the second potential slice in the second space, and calculating a second difference between the center point of the second potential slice in the first space and the center point of the second potential slice in the second space; an actual slice is set based on the second difference; projecting the digital image is further achieved by cropping one or more segments; projecting the digital image is further achieved by rotating one or more segments; the first space is an unprojected space and the second space is a projected space; the first space is latitude/longitude space and the second space is Mercator space; the first space corresponds to a first projection and the second space corresponds to a second projection; both the first projection and the second projection are independent in x and y directions and are monotonic functions in both x and y directions; a projection is provided as an invertable transformation of a dimension from the first space to a second space; actions further include serving the projected image to a client computing device for display to a user; and the projected image is displayed to the user using a browser application executed on the client computing device.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

FIGS. 3A-3C depict non-linear transformation of images in accordance with implementations of the present disclosure.

Like reference numbers represent corresponding parts throughout.

DETAILED DESCRIPTION

Implementations of the present disclosure are generally directed to generating a projected image based on an original image. The present disclosure provides systems and methods for projecting a digital, original image using a non-linear invertible map projection and ensuring that points on the image accurately correspond to points in the underlying map. Implementations of the present disclosure enable mapping between a first projection and a second projection. In some examples, both the first and second projections are independent in x and y directions and are monotonic functions in both x and y directions. For purposes of non-limiting illustration, projections in latitude/longitude space and in Mercator space are discussed herein, both of which satisfy the above criteria (i.e., independent and monotonic). In some examples, a first image in latitude/longitude space (e.g., an image of the Earth) is processed to generate a second image in pixel space (e.g., in Mercator space, as an approximate Mercator projection based on the first image).

As used herein, a projection refers to an invertible process of transforming a single dimension (e.g., x or y) from one space to another (e.g., from latitude/longitude space to Mercator space). The projected image is approximated by dividing the image into segments, scaling and cropping. In some implementations, each segment can be rotated. The original image can be divided into segments by slicing the image in both the x and y directions to provide an un-even grid of slices. Slicing to approximate a non-linear projection with accuracy greater than a threshold number of pixels can be performed by independently applying processes in accordance with implementations of the present disclosure in both the x and y directions. The processes described herein can be supported by web browsers having limited functionality. For example, a web browser that does not support non-linear warping of images can execute implementations of the present disclosure to still achieve an approximate map projection.

Figure 1:
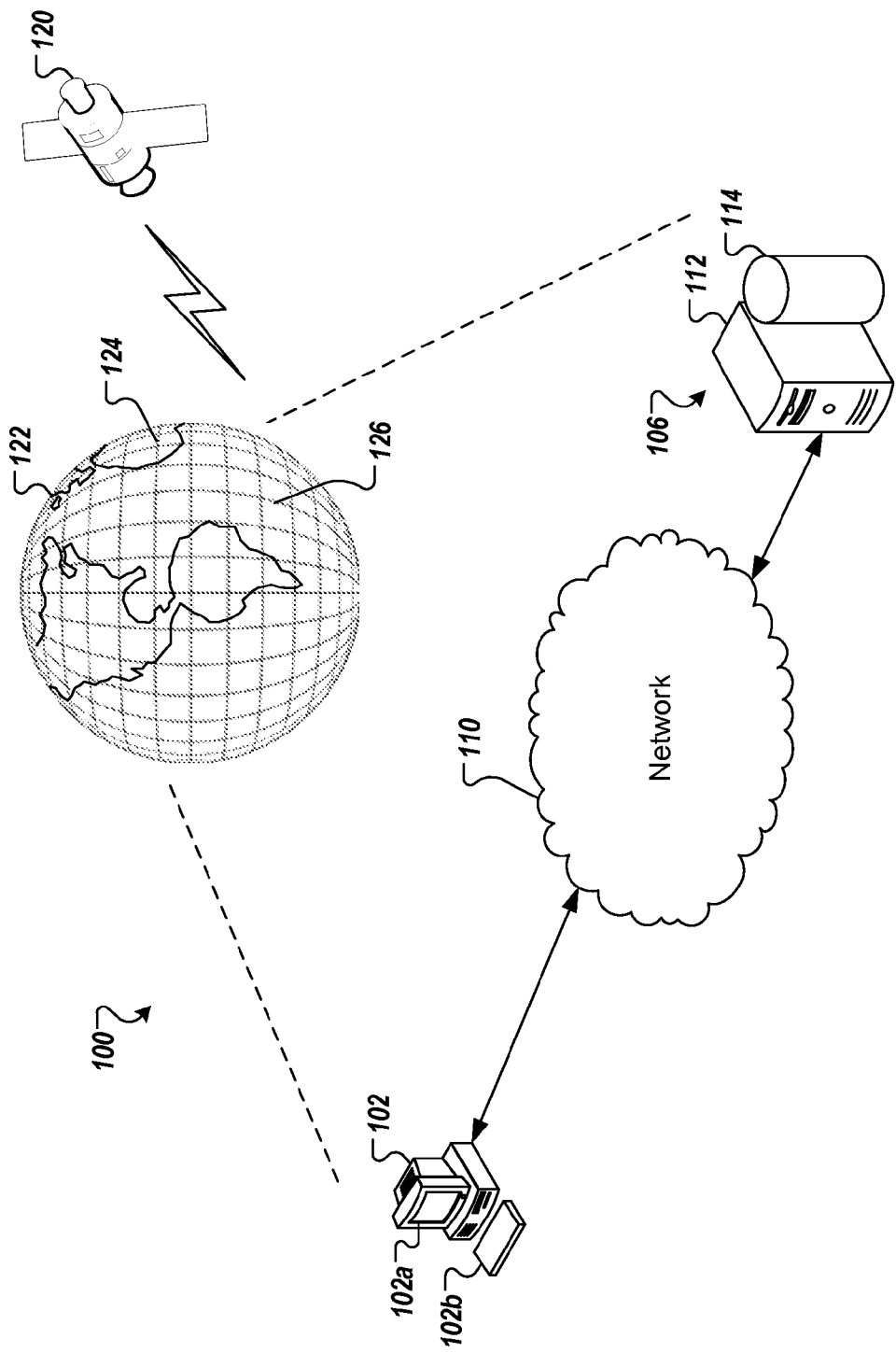
FIG. 1 is a diagram of an example system for generating and transforming digital images.

FIG. 1 is a diagram of an example system 100 for generating and transforming digital images. The example system 100 includes a computing device 102, a server system 106 and a network 110. The computing device 102 and the server system 106 can communicate with one another over the network 110. The computing device 102 can represent various forms of processing devices including, but not limited to, a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any two or more of these data processing devices or other data processing devices.

The server system 106 can represent various forms of server systems including, but not limited to a web server, an application server, a proxy server, a network server, or a server farm. For example, one or more of servers 112 of the server system 108 can be provided as an application server that executes software accessed by the computing device 102. In some implementations, a user can invoke applications available on one or more of the servers 112 in a web browser running on a client (e.g., computing device 102). Each application can individually access data from one or more repository resources (e.g., datastores 114).

In some implementations, the computing device 102 may communicate wirelessly through a communication interface (not shown), which may include digital signal processing circuitry where necessary. The communication interface may provide for communications under various modes or protocols, such as Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, such as using a Bluetooth, WiFi, or other such transceiver.

The network 110 can be a large computer network, such as a local area network (LAN), wide area network (WAN), the Internet, a cellular network, or a combination thereof connecting any number of mobile clients, fixed clients, and/or servers. In some implementations, each client (e.g., computing device 102) can communicate with one or more of the server systems 106 via a virtual private network (VPN), Secure Shell (SSH) tunnel, or other secure network connection. In some implementations, the network 110 can include the Internet, a wireless service network and may include the Public Switched Telephone Network (PSTN). In other implementations, the network 110 may include a corporate network (e.g., an intranet) and one or more wireless access points.

As discussed in further detail herein, an original digital image of a curved surface can be processed to provide a projected image. For example, an original digital image (e.g., in latitude/longitude space) of a curved surface can be processed (e.g., using one or more server systems 106) to provide a projected image (e.g., in Mercator space). In some implementations, the projected image can be provided for display within a web browser (e.g., executed on the computing device 102). In general, and as discussed in further detail herein, the resultant projected image is an approximation of a true projection of the original image.

By way of non-limiting example, and with continued reference to FIG. 1, a satellite 120 can include an image capturing device (not shown) to capture digital images of a planet 122 (e.g., Earth). The planet 122 can include lines of latitude 124 (i.e., parallel lines) and lines of longitude 126 (i.e., meridian lines). The digital images (e.g., provided in latitude/longitude space) can be provided to the server system 106, which can process the digital images to provide corresponding projected images (e.g., in Mercator space). The original digital images can include 2D representations of the curved surface of the planet 122. The projected images include representations of the curved surface of the planet 122 as would be projected onto a flat surface.

Figure 2:
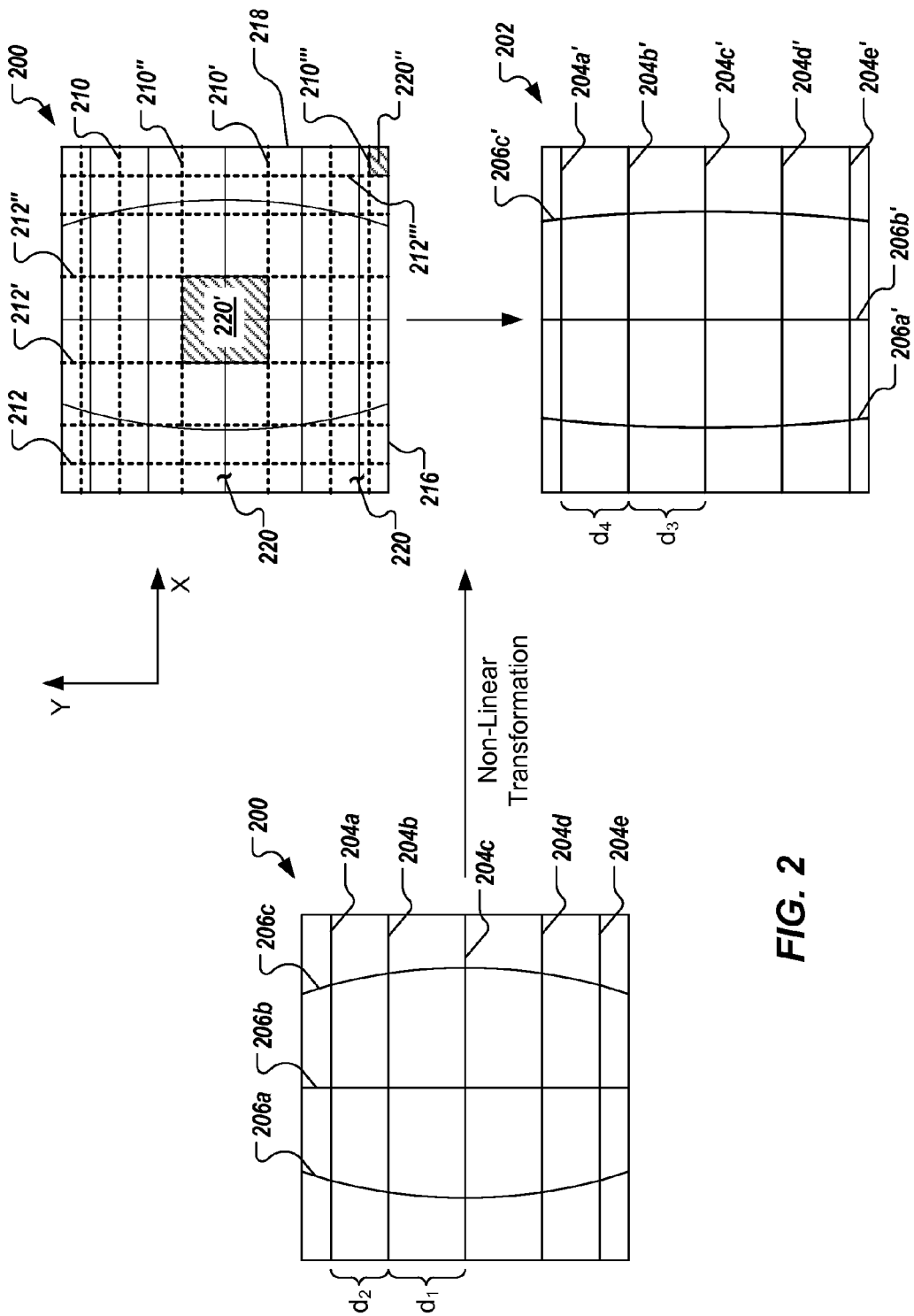
FIG. 2 depicts an example original image and an example projected image that is generated based on the original image.

FIG. 2 depicts an example original image 200 and an example projected image 202 that is generated based on the original image 200. The original image 200 includes a 2D image of a curved surface in latitude/longitude space, which curved surface can include features. For example, the original image 200 can include an image of the Earth, and the features can include buildings, bridges, roads, continents, islands, lakes, oceans and the like. In the example of FIG. 2, and for purposes of illustration, the original image 200 includes parallel lines 204*a*-204*e* (e.g., latitude lines) and meridian lines 206*a*-206*c* (e.g., longitude lines). However, because the actual surface, on which the parallel lines 204*a*-204*e* and the meridian lines 206*a*-206*c* are located, is curved, the distance between parallel lines in the original 2D image 200 can vary. For example, a distance $d_1$ between the parallel line 204*a* and the parallel line 204*b* is less than a distance $d_2$ between the parallel line 204*b* and the parallel line 204*c*. In actuality, the distance between parallel lines should be the same, but the varying distances $d_1$, $d_2$ are a consequence of the curved surface that is the subject matter of the original image 200. As another example, the meridian line 206*b* is a straight line, while the meridian lines 206*a*, 206*c* are curved. In actuality, meridian lines are provided as straight lines, but the curvature of the meridian lines 206*a*, 206*c* is a consequence of the curved surface that is the subject matter of the original image in 2D.

As discussed in further detail herein, the original image 200 can be processed using non-linear transformation techniques to generate the projected image 202 in Mercator space. The projected image 202 can be an approximation of a true projection, such as a Mercator projection, as discussed in further detail below.

As discussed in further detail herein, the non-linear transformation of the present disclosure segments the original image 200 using x-direction slices 210 and y-direction slices 212. The slices 210, 212 define an un-even grid that includes segments 220. The slice grid is un-even in that the distance between adjacent slices 210, 212 is not always equal. Each segment 220 can be scaled and/or cropped in the x and y directions to generate the projected image 202. For example, a segment 220' (shown in hatched line) is defined between x-direction slices 210', 210" and y-direction slices 212', 212". As another example, a segment 220" (shown in hatched line) is defined between a lower bound or edge 216 of the original image 200 and an x-direction slice 210''', and an upper bound or edge 218 and a y-direction slices 212'''. In some implementations, each segment 220 can be rotated to reflect rotation of the projected image 202.

The projected image 202 is a result of scaling of each segment 220 in the x and y directions. Scaling of each segment 220 is achieved using segment-specific scaling factors including an x-direction scaling factor and a y-direction scaling factor. The scaling factors are determined as discussed in further detail below. In the example of FIG. 2, the scaling factors associated with the segment 220' may be different than the scaling factors associated with the segment 220". By way of non-limiting example, an x-direction scaling factor and a y-direction scaling factor may each be approximately equal to one for the segment 220'. Consequently, scaling, if any, of the segment 220' may be minimized in the x and y directions. This is a result of the segment 220' being at the center of the original image 200 and suffering less from warping effects of the curved surface, which are more pronounced toward the edges of the original image 200. An x-direction scaling factor and a y-direction scaling factor for the segment 220" (and every other corner segment for that matter), may be more severe than scaling factors for other segments (e.g., the segment 220'). Consequently, scaling of the segment 220" (and every other corner segment) will be more severe in the x and y directions, than for other segments. This is a result of the segment 220" being at the corner of the original image 200 and suffering the most from warping effects of the curved surface.

In the example of FIG. 2, the projected image 202 includes the parallel lines 204a'-204e' and the meridian lines 206a'-206c'. As a result of the non-linear transformation process, the parallel lines 204a'-204e' are more equally spaced from one another. For example, a distance $d_3$ is provided between the parallel line 204b' and the parallel line 204c', and a distance $d_4$ is provided between the parallel line 204b' and the parallel line 204a'. The distance $d_3$ may be approximately equal to, or slightly greater than the distance $d_1$, and can be approximately equal to or slightly greater than the distance $d_4$. The distance $d_4$ is greater than the distance $d_2$. In general, the following example relationships can be provided:

$$d_1 > d_2;\ d_3 \gtrsim d_1;\ d_3 \gtrsim d_4;\ d_4 > d_2$$

As noted above, the projected image 202 is an approximation of a true projection. For example, a true projection would include the parallel lines 204a'-204e' being equidistant from one another (e.g., $d_3 = d_4$), and the meridian lines 206a'-206c' being provided as straight lines. The projected image 202 is an approximation of a true projection in that the distances between the parallel lines 204a'-204e' are closer to being equal than the distances between the parallel lines 204a-204e of the original image 200, and in that the meridian lines 206a' and 206c' are closer to straight lines (i.e., are less curved) than the meridian lines 206a and 206c of the original image 200.

Figure 3B:
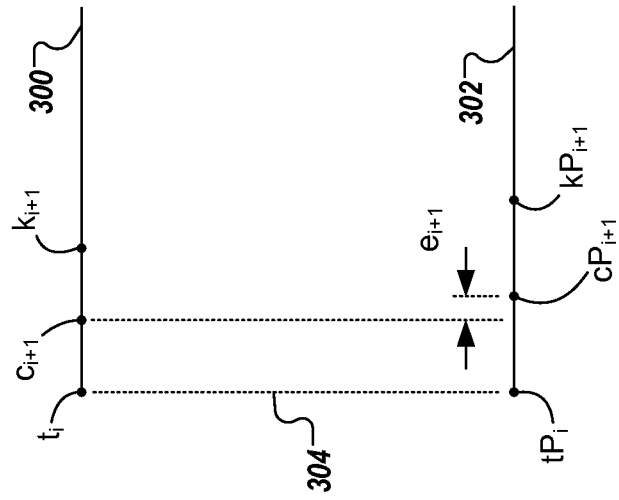
Figure 3A:
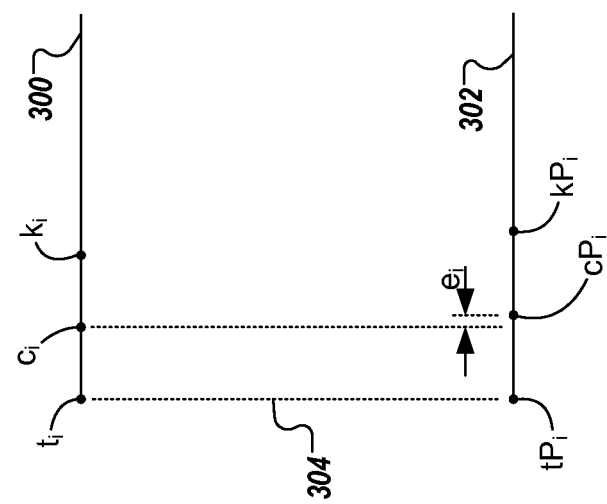

FIGS. 3A-3C depicts non-linear transformation of images in accordance with implementations of the present disclosure. An original digital image representative of an un-projected domain 300 is received (e.g., by the server system 106 of FIG. 1). Upper and lower bounds of the image are respectively projected to a projected domain 302 as a minimum and a maximum, respectively. The projected domain 302 is representative of a true projection (e.g., a Mercator projection). In the example of FIGS. 3A-3C, a lower bound is illustrated and can correspond to an edge of the original image. Processes iterate between the minimum to maximum, as discussed in further detail herein. In each iteration, a potential slice is generated (e.g., slice 210, 212). The potential slice extends, in the projected domain 302, from the location of the previous slice to a current projected point, provided as kP. The location of the previous slice is provided as tP, and an equivalent location the original image (i.e., the un-projected domain 300) is provided as t. An inverse projection can be used to determine a point k in the original image that corresponds to kP. The start and end of a projected segment aligns with an ideal projection.

A center of a current slice in the projected domain 302 is provided as cP, and is calculated based on the following relationship:

$$cP = (kP + tP)/2$$

The center of the current slice in un-projected domain 300 is provided as c, and is calculated based on the following relationship:

$$c = (k + t)/2$$

An error e can be calculated as the difference between c and cP. The error e can be compared to a threshold error ($e_{THR}$). If e is greater than $e_{THR}$, the original image is sliced at the previous value of k. A segment of the original image can be approximated from t to k by linearly scaling that portion of the image to fit the projected slice from tP to kP with an error less than $e_{THR}$. If, however, e is not greater than $e_{THR}$, the process is repeated for a next row or column, where a row corresponds to slicing along the x-direction, and a column corresponds to slicing along the y-direction (see FIG. 2). If a slice is provided, the slice is located at tP. Slices are adjacent and run parallel to previous slices.

With particular reference to FIG. 3A, a first iteration i is depicted, beginning at the lower bound (minimum), which is provided as an edge of the original image. The lower bound, point $t_i$, of the un-projected domain 300 corresponds to a point $tP_i$ in the projected domain 302. A point $k_i$ on the un-projected domain 300 is selected and correspond to a point $kP_i$ in the projected domain 302. The point $kP_i$ corresponds to where the point $k_i$ would be projected to in a true projection. The center $c_i$ between the points $t_i$ and $k_i$ and the center $cP_i$ between the points $tP_i$ and $kP_i$ are determined. The distance $e_i$ between $c_i$ and $cP_i$ is determined and is compared to the threshold $e_{THR}$. In the example of FIG. 3A, it is provided that $e_i$ is not greater than $e_{THR}$. Consequently, a slice is not yet provided in the iteration i.

With particular reference to FIG. 3B, a second iteration i+1 is depicted, in which a point $k_{i+1}$ is selected in the un-projected domain 300. The point $k_{i+1}$ is projected to the projected domain 302 as $kP_{i+1}$. The center $c_{i+1}$ between the points $t_i$ and $k_{i+1}$ and the center $cP_{i+1}$ between the points $tP_i$ and $kP_{i+1}$ are determined. The distance $e_{i+1}$ between $c_{i+1}$ and $cP_{i+1}$ is determined and is compared to the threshold $e_{THR}$. In the example of FIG. 3B, it is provided that $e_{i+1}$ is greater than $e_{THR}$. Consequently, a slice is now provided along $k_i$ of the iteration i.

With particular reference to FIG. 3C, a third iteration i+2 is depicted and begins with the previously generated slice provided along $k_i$, now indicated as $t_{i+2}$. The point $t_{i+2}$ of the un-projected domain 300 is projected to the projected domain 302 as $tP_{i+2}$. A point $k_{i+2}$ on the curved surface 300 is selected and is projected to the projected domain 302 as $kP_{i+2}$. The center $c_{i+2}$ between the points $t_{i+2}$ and $k_{i+2}$ and the center $cP_{i+2}$ between the points $tP_{i+2}$ and $kP_{i+2}$ are determined. The distance $e_{i+2}$ between $c_{i+2}$ and $cP_{i+2}$ is determined and is compared to the threshold $e_{THR}$.

This process is repeated for each iteration starting at the last slice until the upper bound (maximum), which is provided as the opposite edge of the original image for the first direction (e.g., x or y), is reached. Slicing is performed by cropping the original image so that only the segment between t and k is visible for a given iteration. The process is then repeated for the second direction (e.g., y or x) to provide an un-even grid of slices defining various sized segments (e.g., segments 220', 22o" of FIG. 2). If the slicing process is along the x-direction, the resultant slices run parallel to the y-direction. Likewise, if the slicing process is along the y-direction, the resultant slices run parallel to the x-direction. As discussed above, each segment is scaled in the x and y directions based on segment specific scaling factors. The scaling factors can each be determined based on the difference between kP and tP used in the slicing operations.

In some implementations, scaling and cropping of the original image can be executed using a web browser (e.g., at the computing device 102 of FIG. 1). For example, cropping can be performed by absolute positioning within a smaller document object model (DOM) node (e.g., DIV) with the overflow being hidden. Scaling and cropping can be performed by linearly scaling the image (e.g., using a browsers image scaling functionality) before positioning it within the DIV. DIV tags can be used to structure the graphical display of web pages in an HTML document as a hierarchy of sub-divisions. The hierarchy supports scaling of objects, such as images, that can be nested within the sub-divisions created by the DIV tags. Each sub-division can correspond to a segment (e.g., segments 220) of the sliced image.

The result of the non-linear transformation processes described herein is that each segment of the original image is cropped and linearly scaled in both x and y such that the delta between the post-scaling position of the middle pixel of the segment, and the desired position of that pixel under the current projection, is less than the desired level of error. The accuracy of warping can be increased or decreased as desired by adjusting $e_{THR}$. Smaller values of $e_{THR}$ will result in more slices (and therefore more DOM nodes). On slower systems, $e_{THR}$ can be increased to reduce the number of slices, thereby increasing performance.

Rotation of the overall image by 90, 180 or 270 degrees can be performed independently of slicing. Rotation can be performed by rotating each segment, and re-ordering the segments before display or via rotation of the pre-composited images within a parent container. Rotation of images is available via the vector graphics implementations in older versions of web browsers (e.g., using scalable vector graphics (SVG) in Firefox, or vector mark-up language (VML) in Internet Explorer). Newer versions of web browsers can provide rotation in cascading style sheets (CSS), but may not support non-linear warping.

Figure 4:
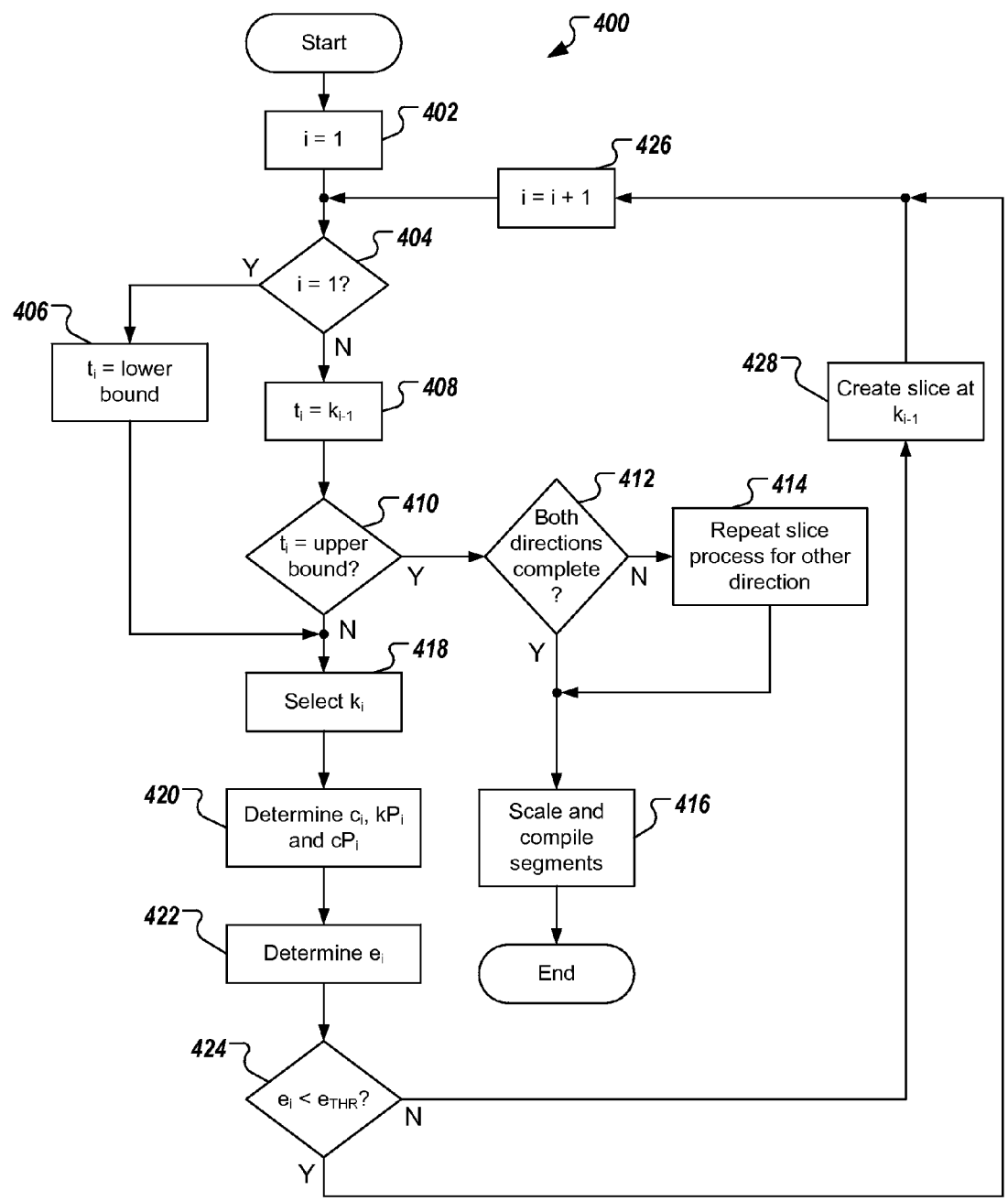
FIG. 4 is a flowchart illustrating an example process that can be executed in implementations of the present disclosure.

FIG. 4 is a flowchart illustrating an example process 400 that can be executed in implementations of the present disclosure. The process 400 can be executed using one or more applications executed on a computing device. In some implementations, the example process 400 can be executed by a web browser on a client computing device. In some implementations, the example process 400 can be executed on one or more servers that provide data to a client computing device. The example process 400 can be executed for each direction (i.e., x and y) of an original image, beginning at a lower bound to an upper bound. For example, and considering the x-direction, the lower bound can include the right-most edge of the original image, and the upper bound can include the left-most edge of the original image. As another example, and considering the y-direction, the lower bound can include the right-most edge of the original image, and the upper bound can include the left-most edge of the original image.

A counter i is set equal to 1 (402). It is determined whether the counter i is equal to 1 (404). If the counter i is equal to 1, $t_i$ is set equal to the lower bound of the original image (406). If the counter i is not equal to i, $t_i$ is set equal to $k_{i-1}$ (408). It is determined whether $t_i$ is the upper bound (410). If $t_i$ is the upper bound, the process 400 has iterated across the original image in at least a one direction (e.g., x or y direction), and it is determined whether both directions (i.e., x and y directions) have been completed (412). If both directions have not been completed, the slice process is repeated for the other direction (e.g., x or y direction) (414). If both directions have been completed, the segments are scaled and compiled to provide a projected image (416).

If $t_i$ is not the upper bound (410), a potential slice $k_i$ is selected (418). Based on the potential slice $k_i$ and the previous slice $t_i$, $c_i$, $kP_i$ and $cP_i$ are determined (420). The difference $e_i$ between $c_i$ and $cP_i$ is determined (422). It is determined whether $e_i$ is less than $e_{THR}$ (424). If $e_i$ is less than $e_{THR}$, the counter i is incremented (426) and the process 400 loops back to 404. If $e_i$ is not less than $e_{THR}$, a slice is created at $k_{i-1}$ (428), and the process loops to 426.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the invention can be realized as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclose can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the present disclosure can be realized in a computing system that includes a back end component, e.g., as a data server, or that includes a middleware component, e.g., an application server, or that includes a front end component, e.g., a client computer having a graphical user interface or a Web browser through which a user can interact with an implementation of the present disclosure, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results.

What is claimed is:

1. A system comprising:
    a computing device; and
    a computer-readable medium coupled to the computing device and having instructions stored thereon which, when executed by the computing device, cause the computing device to perform operations comprising:
        receive an image file including image data corresponding to a digital image, the digital image being provided in a first space; and
        projecting the digital image using a non-linear invertible map projection to generate a projected image, the projected image being provided in a second space, wherein projecting the digital image is achieved by:
            dividing the digital image into segments;
            scaling each segment to provide modified segments; and
            generating the projected image using the modified segments.

2. The system of claim 1, wherein dividing the digital image into segments comprises, for each of an x-direction and a y-direction of the digital image:
    projecting an upper bound of the digital image as a maximum;
    projecting a lower bound of the digital image as a minimum; and
    iterating from the minimum to the maximum to provide one or more slices in the image, the one or more slices defining the segments.

3. The system of claim 1, wherein dividing the digital image into segments comprises, for each of an x-direction and a y-direction of the digital image:
- providing a potential slice that extends from a previous actual slice and a current projected point;
- determining a center point of the potential slice in the first space;
- determining a center point of the potential slice in the second space; and
- calculating a difference between the center point of the potential slice in the first space and the center point of the potential slice in the second space.

4. The system of claim 3, wherein dividing the digital image into segments further comprises, for each of an x-direction and a y-direction of the digital image:
- determining that the difference is greater than or equal to a threshold difference; and
- in response to determining that the difference is greater than or equal to a threshold difference, setting a previous potential slice as an actual slice.

5. The system of claim 3, wherein dividing the digital image into segments further comprises, for each of an x-direction and a y-direction of the digital image:
- determining that the difference is less than a threshold difference; and
- in response to determining that the difference is less than a threshold difference:
  - selecting a second potential slice;
  - determining a center point of the second potential slice in the first space;
  - determining a center point of the second potential slice in the second space; and
  - calculating a second difference between the center point of the second potential slice in the first space and the center point of the second potential slice in the second space.

6. The system of claim 5, wherein an actual slice is set based on the second difference.

7. The system of claim 1, wherein projecting the digital image is further achieved by cropping one or more segments.

8. The system of claim 1, wherein projecting the digital image is further achieved by rotating one or more segments.

9. The system of claim 1, wherein the first space is an unprojected space and the second space is a projected space.

10. The system of claim 1, wherein the first space is latitude/longitude space and the second space is Mercator space.

11. The system of claim 1, wherein the first space corresponds to a first projection and the second space corresponds to a second projection.

12. The system of claim 11, wherein both the first projection and the second projection are independent in x and y directions and are monotonic functions in both x and y directions.

13. The system of claim 11, wherein a projection is provided as an invertable transformation of a dimension from the first space to a second space.

14. The system of claim 1, wherein the operations further comprise:
- serving the projected image to a client computing device for display to a user.

15. The system of claim 14, wherein the projected image is displayed to the user using a browser application executed on the client computing device.

16. A non-transitory computer storage medium encoded with a computer program, the program comprising instructions that when executed by data processing apparatus cause the data processing apparatus to perform operations comprising:
- receiving an image file including image data corresponding to a digital image, the digital image being provided in a first space; and
- projecting the digital image using a non-linear invertible map projection to generate a projected image, the projected image being provided in a second space, wherein projecting the digital image is achieved by:
  - dividing the digital image into segments;
  - scaling each segment to provide modified segments; and
  - generating the projected image using the modified segments.

17. A computer-implemented method comprising:
- receiving an image file including image data corresponding to a digital image, the digital image being provided in a first space; and
- projecting the digital image using a non-linear invertible map projection to generate a projected image, the projected image being provided in a second space, wherein projecting the digital image is achieved by:
  - dividing the digital image into segments;
  - scaling each segment to provide modified segments; and
  - generating the projected image using the modified segments.

* * * * *